April 28, 1942.   A. D. KEENE ET AL   2,281,241
ELECTRIC TOASTER OPERATING MECHANISM
Filed Nov. 12, 1940   2 Sheets—Sheet 1

INVENTORS
ALVIN D. KEENE &
THEODORE S. KREBS
BY
ATTORNEY

April 28, 1942. A. D. KEENE ET AL 2,281,241
ELECTRIC TOASTER OPERATING MECHANISM
Filed Nov. 12, 1940    2 Sheets-Sheet 2

INVENTORS
ALVIN D. KEENE &
THEODORE S. KREBS
BY
ATTORNEY

Patented Apr. 28, 1942

2,281,241

UNITED STATES PATENT OFFICE 2,281,241

ELECTRIC TOASTER OPERATING MECHANISM

Alvin D. Keene and Theodore S. Krebs, Rochester, N. Y., assignors to Samson-United Corporation, Rochester, N. Y., a corporation of Delaware Application November 12, 1940, Serial No. 365,219

4 Claims. (Cl. 219—19)

This invention relates to electric toasters and more particularly to the operating and controlling mechanism thereof and the principal object of this invention is to provide a novel construction for an operating and controlling mechanism which is complete as a unitary structure for attachment as such to the toaster in the assembly thereof.

Another object of this invention is to provide the operating and control mechanism for an electric toaster with a novel toast releasing and switch operating mechanism.

These and other objects and attendant advantages of this invention will become more readily apparent from the detailed description thereof which follows, reference being had to the accompanying drawings in which Figure 1 is a top plan view of the operating and controlling mechanism for electric toasters.

In the operating and controlling mechanism for electric toasters forming the subject matter of our present invention, the entire mechanism is mounted on the movement panel 1 which provides a vertical base member for the support of the entire mechanism. In this way the operating and controlling mechanism is assembled as a complete unit for quick and easy attachment to the toaster.

Figure 3:
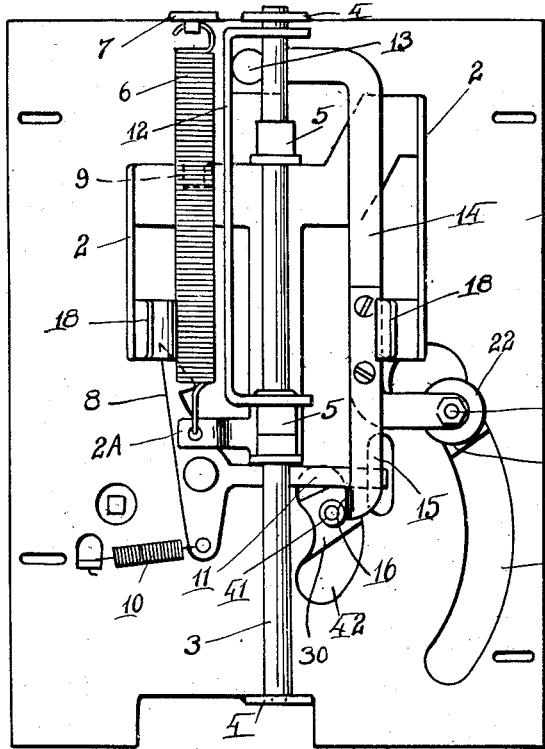
Figure 3 is an elevational view of the inside thereof.

The operating mechanism embodies a carrier 2 which is slidably mounted on the vertically arranged guide post 3. The latter is supported on the top and bottom by the lugs 4, 4 struck from the movement panel, and bearings 5, 5 support and guide the carrier on the guide post in a straight line movement between the lugs 4, 4. A tension spring 6 is mounted between the carrier and the movement panel and is attached to the lug 2A of the carrier with its lower end and to the lug 7 of the movement panel with its upper end. This spring normally holds the carrier in its elevated inoperative position illustrated in Figure 3.

Figure 4:
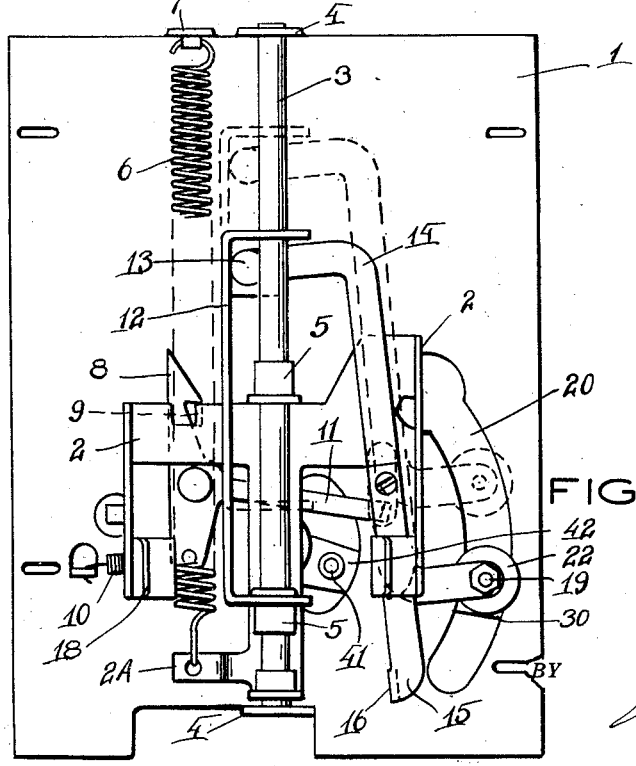
Figure 4 is an elevational view similar to that of Figure 3 with the mechanism in its operative position.

Mounted to swing on the inside of the movement panel is the dog 8 which is adapted to engage the lug 9 carried by the carrier when the latter is depressed for the toaster operation. The engagement of the dog 8 with the lug 9 temporarily locks the carrier in its operative position illustrated in Figure 4 in which the carrier supports the slices of bread for toasting as will hereinafter appear. The dog is yieldingly held in engagement with the lug 9 by the spring 10 and an arm 11 projecting from the dog is provided for the disengagement of the dog from the lug and the release of the carrier as will hereinafter be described.

Mounted on the guide post 3 independently of the carrier 2 is a slide 12. This slide has pivotally attached thereto at 13 the upper end of the substantially Z shaped link 14. Attached to the central portion of this link is an extension 15 which carries at the bottom the inturned lug 16 for engagement with the arm 11 of the dog 8 for the release of the carrier 2. For this purpose the slide 12 is raised by its handle 17 independently of the carrier 2 so as to have the lug 16 engage the arm 11 and move the dog 8 out of engagement with the lug 9 for the release of the carrier 2. Spring 6 is then free to raise the carrier from the position illustrated in Figure 4 to the position illustrated in Figure 3. On this movement of the carrier 2 the slices of bread supported by its slice supporting members 18, 18 are partially raised out of the toaster frame (not shown) so that they may be withdrawn therefrom.

In order to shut off the electric current at the same time the toasted slices are raised for withdrawal from the toaster, the bottom end of the Z shaped link 14 carries the stud 19 which projects thru the segmental slot 20 and carries the insulating bushing 21 on the outside of the movement panel. Suitable flanges 22, 22, one on each side of the slot 20, guide the stud in the slot in the movement thereof. As above described, such movement may be manual on the raising of the slide 12 by means of the handle 17 and when this takes place the stud 19 is raised by the Z shaped link 14 so that when the carrier 2 is released, the insulating bushing at the same time engages the spring finger 23 and moves it to one side to break the contact between its button 24 and the button 25 carried by the finger 26. The two fingers 23 and 26 and their contact buttons 24 and 25 provide an electric switch for the control of the electric current for the operation of the toaster so that whenever the carrier 2 of the toaster is operated to raise the toasted slices of bread for the withdrawal thereof after the desired toasting operation is completed, the electric current is automatically shut off at the same time.

Figure 1:
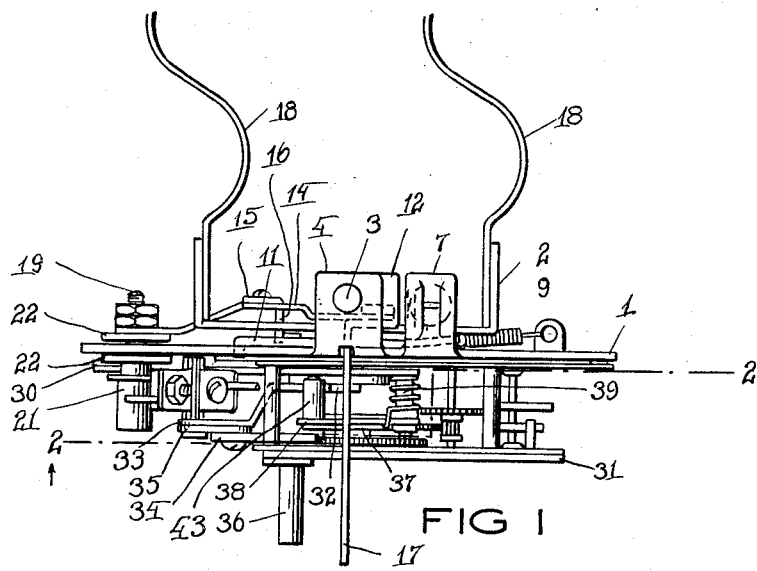
Figure 2:
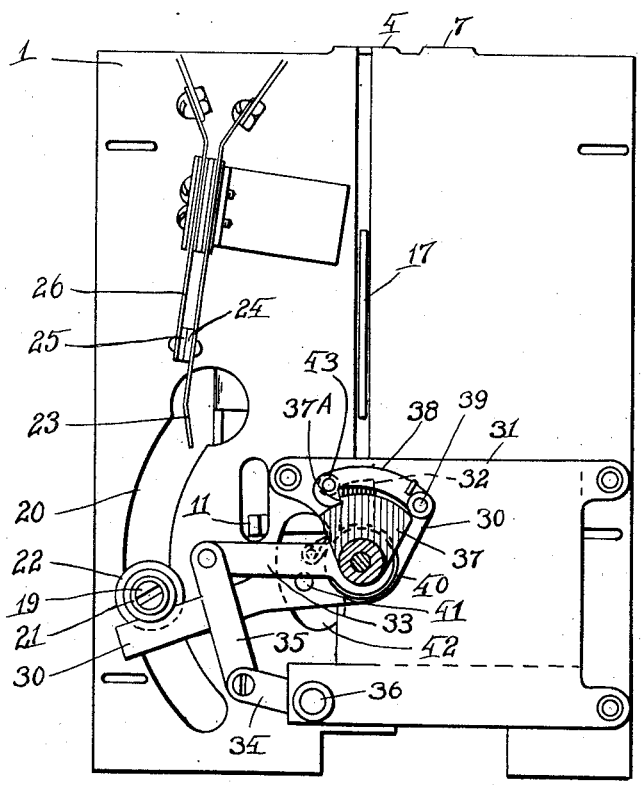
Figure 2 is an elevational view of the outside thereof.

The automatic operation of the toaster mechanism is controlled by a suitable clock mechanism which forms no part of our invention and is attached to the outside of the movement panel as illustrated in Figures 1 and 2. This clock mechanism embodies the spring operated lever 30 which is pivotally mounted in the frame 31 of the clock mechanism and projects therefrom for engagement of the stud 19 and movement thereof. Mounted adjacent to the pivoted end of the lever 19 and concentrically thereto is the adjustable cam arm 32 which is adapted to be manually adjusted and held in predetermined positions by means of the crank arm 33 and connected to the pointer arm 34 by means of the link 35. The pointer arm is mounted on the pointer shaft 36 so that a suitable pointer handle (not shown) can move the shaft and set the cam arm 32 in any desired position for automatic release of the carrier 2 as will hereinafter appear.

Mounted on a suitable stud concentric to the center of rotation of the lever 30 and cam arm 32 and in front thereof as illustrated in Figure 2 is the latch cam 37. A spring pressed latch 38 pivoted on the stud 39 is adapted to slide over the cam 37 and engage the notch 37A therein. The stud 39 on which the latch is mounted is carried by an extension of the lever 30 so that the latch moves in unison with the lever 30 and by its engagement of the notch 37A holds the lever in a predetermined position after the latter is moved into this position at the end of the downward movement of the slide 12 and carrier 2 into their operative position.

Moving the lever 30 downwardly into its operative position tensions the spring 40 for the return thereof. This return movement is controlled by the clock mechanism which embodies an escape movement and is connected with the lever 30 by means of the spring pressed latch 38 in its engagement with the notch in the latch cam 37.

The lever 30 carries a stud 41 which projects thru a slot 42 in the movement panel. This stud is adapted to engage and move the arm 11 on the return movement of the lever 30 to thus operate the dog 8 and release the carrier for movement by the spring 10. The return movement of the lever 30 from the position into which it is moved by placing the carrier 2 into its operative position thus causes the release of the carrier from this operative position whenever the stud 41 carried by the lever 30 moves the arm 11 for the release of the dog 8. This time may be varied in order to provide any desired toasting period for the slices of bread supported by the supporting member 18 of the carrier 2.

The slices of bread are toasted the longest when the lever 30 is allowed to slowly move under the control of the clock mechanism the full distance from its lowermost position until it operates the arm 11 for the release of the carrier 2 as above described. Any desired shorter toasting period is secured by adjusting the position of the lever cam 32 so that on the movement of the lever 30 the stud 43 carried by the spring pressed latch 38 rides up on the cam arm 32 and disengages the spring pressed latch from the notch 37A of the cam 37. This breaks the connection between the lever 30 and the controlling clock mechanism and permits the spring 40 to immediately raise the lever 30 to operate the arm 11 for the release of the carrier 2 and move the insulating bushing 21 of the stud 19 into engagement with the finger 23 to open the electric circuit between the contact buttons 24 and 25. In this way the time for the release of the carrier may be lengthened or shortened by positioning the cam arm in a position in which the spring pressed latch 38 is disengaged from the cam notch 37A after the lever 30 has been moved by the clock mechanism for a predetermined time period.

We claim:

1. An electric toaster operating mechanism comprising a movement panel, a guide post on said movement panel, a carrier movable on said post, a slide movable on said guide post for movement of said carrier in one direction, a spring for movement of said carrier in the opposite direction, a dog for engagement of said carrier to hold said carrier against movement by said spring, a link pivotally mounted on said slide for endwise movement therewith, a guide slot in said movement panel, a stud carried by said link and movement in said guide slot to cause lateral swinging movement of the link on its movement with said slide, and a lug carried by said link for engagement of said dog and disengagement from said carrier to permit movement of said carrier with said slide on said post by said spring.

2. An electric toaster operating mechanism comprising a movement panel, a guide post on said movement panel, a carrier movable on said guide post, a spring for movement of said carrier, a slide movable on said guide post independently of said carrier, a dog movable on said movement panel for engagement with said carrier, means carried by said slide for operation of said dog to release said carrier for movement by said spring, and electric switch means comprising a pair of separable contacts adapted to be separated by a stud carried by said first mentioned means on the movement thereof by said slide.

3. An electric toaster operating mechanism comprising a movement plate having a pair of concentrically arranged segmental slots therein, a carrier movable on said movement plate, a slide movable on said movement plate for movement of said carrier in one direction, a spring operated dog on said movement plate for engagement of said carrier, a link carried by said slide, a stud carried by said slide for movement in one of said slots to cause lateral swinging movement of said link on its endwise movement with said slide, means carried by said slide for engagement of said dog and release of said carrier on the movement of said link in one direction, a spring operated arm pivotally mounted on said movement plate for engagement of said stud and movement thereof with said link and slide in one direction, a stud carried by said arm for movement in the other of said slots and engagement of said dog for the release of said carrier prior to the engagement of said dog by the means carried by the link.

4. An electric toaster operating mechanism as set forth in claim 3 including a spring pressed latch carried by said spring operated arm, a movable latch plate having a notch therein for engagement by said latch, a clock mechanism for controlling the movement of said latch plate, and an adjustable lever cam adapted to disengage said latch out of said notch and release said spring operated arm from the control of said clock mechanism.

ALVIN D. KEENE.
THEODORE S. KREBS.